(12) United States Patent
Park et al.

(10) Patent No.: US 11,063,290 B2
(45) Date of Patent: Jul. 13, 2021

(54) LITHIUM SECONDARY BATTERY

(71) Applicant: LG CHEM, LTD., Seoul (KR)

(72) Inventors: Eunkyung Park, Daejeon (KR);
Minchul Jang, Daejeon (KR);
Byoungkuk Son, Daejeon (KR);
Junghun Choi, Daejeon (KR);
Donghyeon Kang, Daejeon (KR); Bora Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 61 days.

(21) Appl. No.: 16/467,186

(22) PCT Filed: Jun. 21, 2018

(86) PCT No.: PCT/KR2018/007040
§ 371 (c)(1),
(2) Date: Jun. 6, 2019

(87) PCT Pub. No.: WO2018/236166
PCT Pub. Date: Dec. 27, 2018

(65) Prior Publication Data
US 2020/0075990 A1    Mar. 5, 2020

(30) Foreign Application Priority Data

Jun. 21, 2017 (KR) .................. 10-2017-0078615
Jun. 20, 2018 (KR) .................. 10-2018-0070931

(51) Int. Cl.
*H01M 10/052* (2010.01)
*H01M 4/36* (2006.01)
(Continued)

(52) U.S. Cl.
CPC ......... *H01M 10/052* (2013.01); *H01M 4/366* (2013.01); *H01M 4/382* (2013.01);
(Continued)

(58) Field of Classification Search
None
See application file for complete search history.

(56) References Cited

U.S. PATENT DOCUMENTS

2004/0209159 A1*  10/2004  Lee .................... H01M 10/052
                                                  429/137
2005/0074671 A1   4/2005  Sugiyama et al.
(Continued)

FOREIGN PATENT DOCUMENTS

JP    2002-93463 A    3/2002
JP    2002-237293 A   8/2002
(Continued)

OTHER PUBLICATIONS

Extended European Search Report, dated Dec. 16, 2019, for European Application No. 18819672.9.
(Continued)

*Primary Examiner* — Alix E Eggerding
(74) *Attorney, Agent, or Firm* — Birch, Stewart, Kolasch & Birch, LLP

(57) ABSTRACT

A lithium secondary battery prepared to a negative electrode free battery, and forming lithium metal on a negative electrode current collector through charge. The lithium secondary battery forms lithium metal while being blocked from the atmosphere, and since production of a surface oxide layer (native layer) formed on an existing negative electrode is fundamentally blocked, resulting battery efficiency and lifetime property decline may be prevented.

12 Claims, 8 Drawing Sheets

(51) Int. Cl.
*H01M 4/38* (2006.01)
*H01M 4/485* (2010.01)
*H01M 4/505* (2010.01)
*H01M 4/525* (2010.01)
*H01M 4/62* (2006.01)

(52) U.S. Cl.
CPC ........... *H01M 4/485* (2013.01); *H01M 4/505* (2013.01); *H01M 4/525* (2013.01); *H01M 4/628* (2013.01)

(56) References Cited

U.S. PATENT DOCUMENTS

| | | |
|---|---|---|
| 2010/0178569 A1 | 7/2010 | Ihara et al. |
| 2014/0242462 A1 | 8/2014 | Wang |
| 2015/0295246 A1 | 10/2015 | Son et al. |
| 2015/0333315 A1* | 11/2015 | Yoon ............... H01M 4/624 429/217 |
| 2015/0380176 A1 | 12/2015 | Seo et al. |
| 2016/0344021 A1* | 11/2016 | Seo ............. H01M 4/667 |
| 2017/0133660 A1 | 5/2017 | Kurihara et al. |
| 2018/0197691 A1 | 7/2018 | Song et al. |
| 2018/0358659 A1* | 12/2018 | Subbaraman ..... H01M 10/0525 |

FOREIGN PATENT DOCUMENTS

| | | |
|---|---|---|
| JP | 2004-319489 A | 11/2004 |
| JP | 4037229 B2 | 1/2008 |
| JP | 2014-203715 A | 10/2014 |
| JP | 2016-517611 A | 6/2016 |
| JP | 2016-527679 A | 9/2016 |
| KR | 10-2004-0095851 A | 11/2004 |
| KR | 10-2013-0112567 A | 10/2013 |
| KR | 10-1503807 B1 | 3/2015 |
| KR | 10-2015-0117261 A | 10/2015 |
| KR | 10-2016-0052323 A | 5/2016 |
| KR | 10-2016-0138120 A | 12/2016 |
| KR | 10-2017-0003209 A | 1/2017 |
| KR | 10-2017-0113908 A | 10/2017 |

OTHER PUBLICATIONS

Qian et al., "Anode-Free Rechargeable Lithium Metal Batteries", Adv. Funct. Mater., vol. 26, 2016, pp. 7094-7102 (9 pages).
International Search Report (PCT/ISA/210) issued in PCT/KR2018/007040, dated Oct. 30, 2018.
Yan et al., "Selective deposition and stable encapsulation of lithium through heterogeneous seeded growth", Nature Energy, 2016, vol. 1, Article No. 16010, pp. 1-8.
Yan et al., "Ultrathin Two-Dimensional Atomic Crystals as Stable Interfacial Layer for Improvement of Lithium Metal Anode", Nano Letters, 2014, vol. 14, No. 10, pp. 6016-6022.

* cited by examiner

【Figure 1】
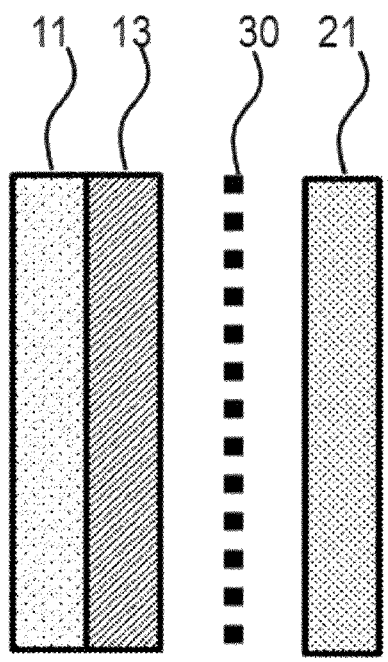
【Figure 2】
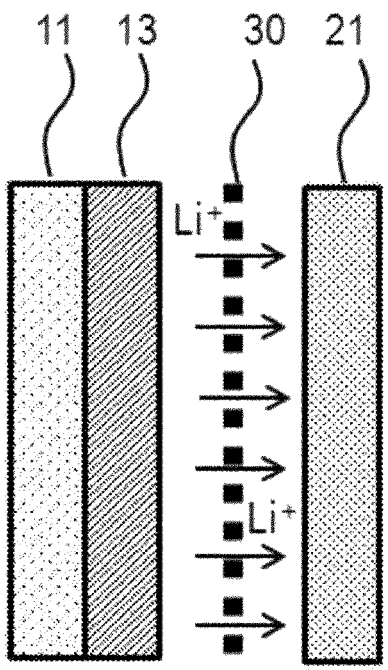

【Figure 3】
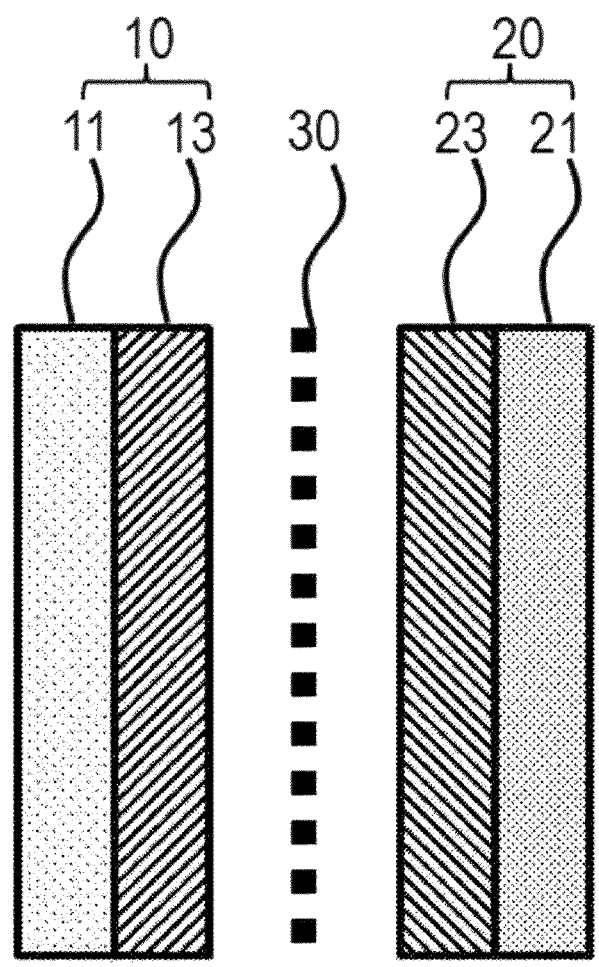

【Figure 4】
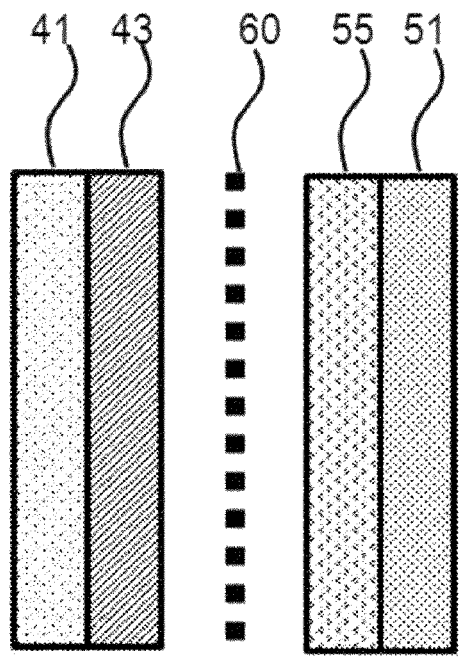
【Figure 5】
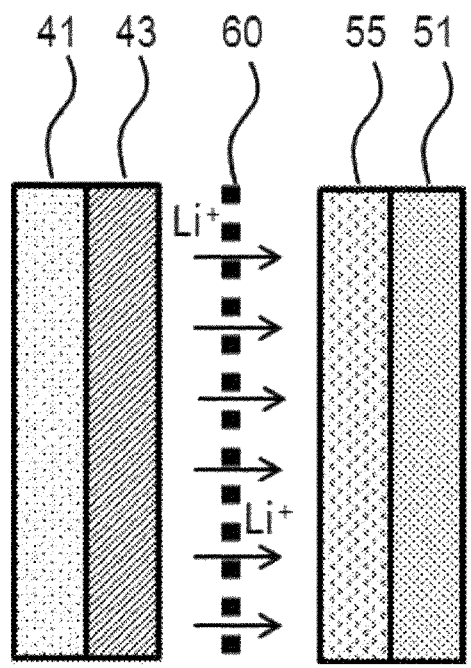

[Figure 6]
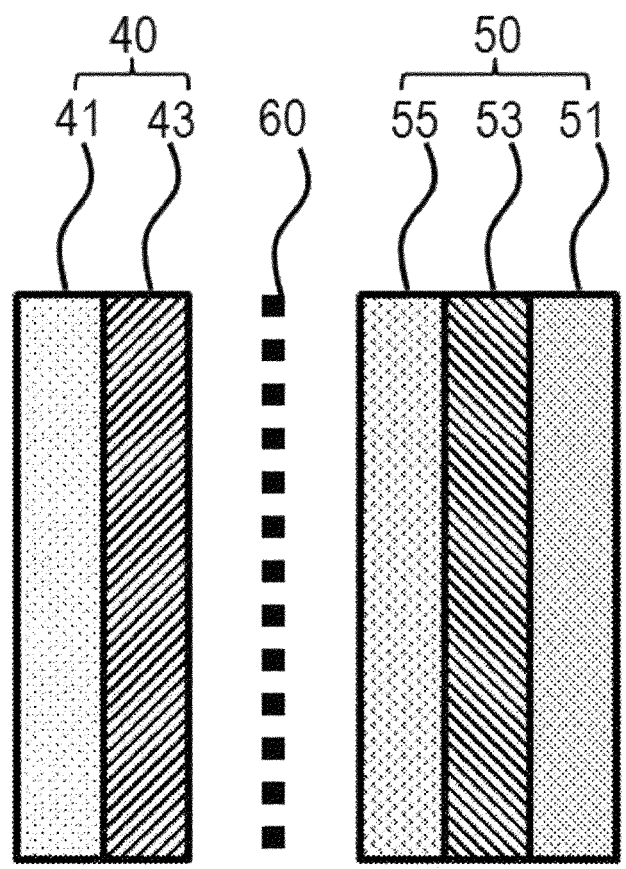

【Figure 7】
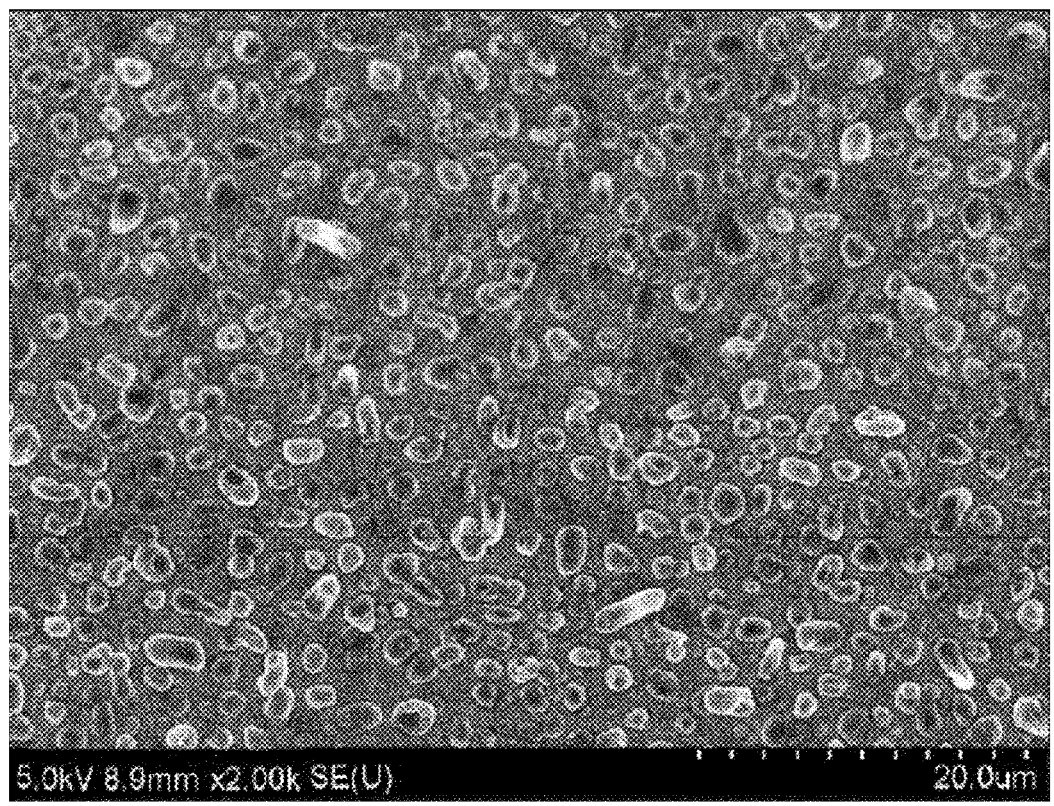

[Figure 8]
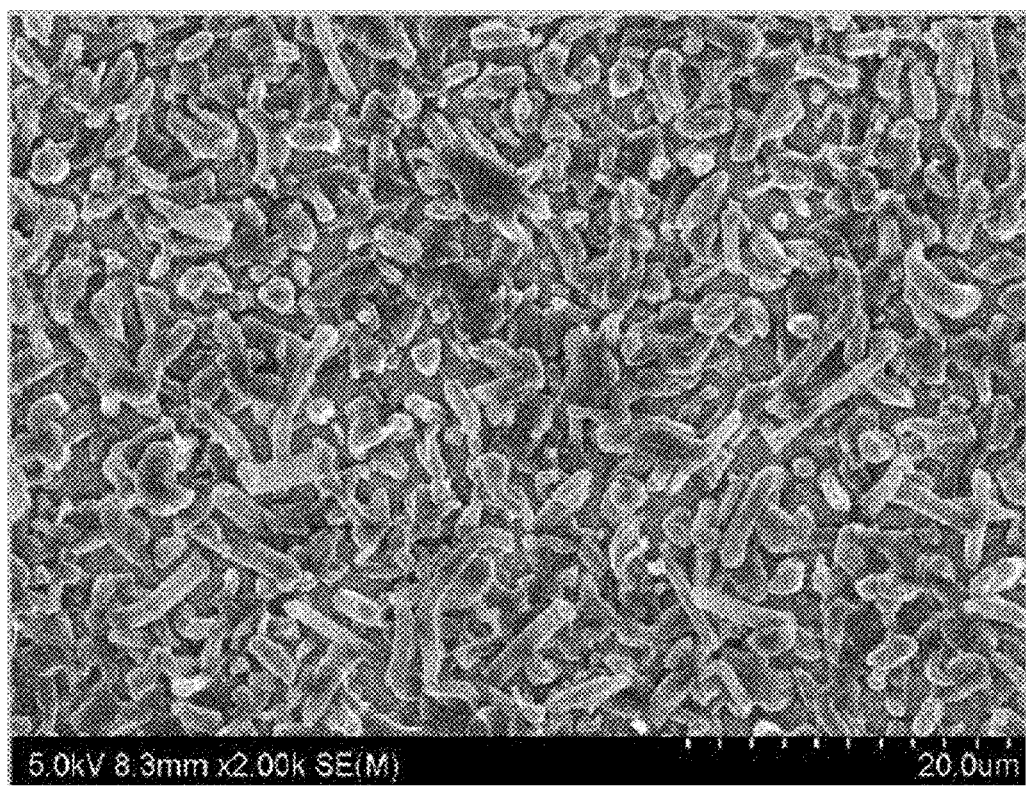

[Figure 9]
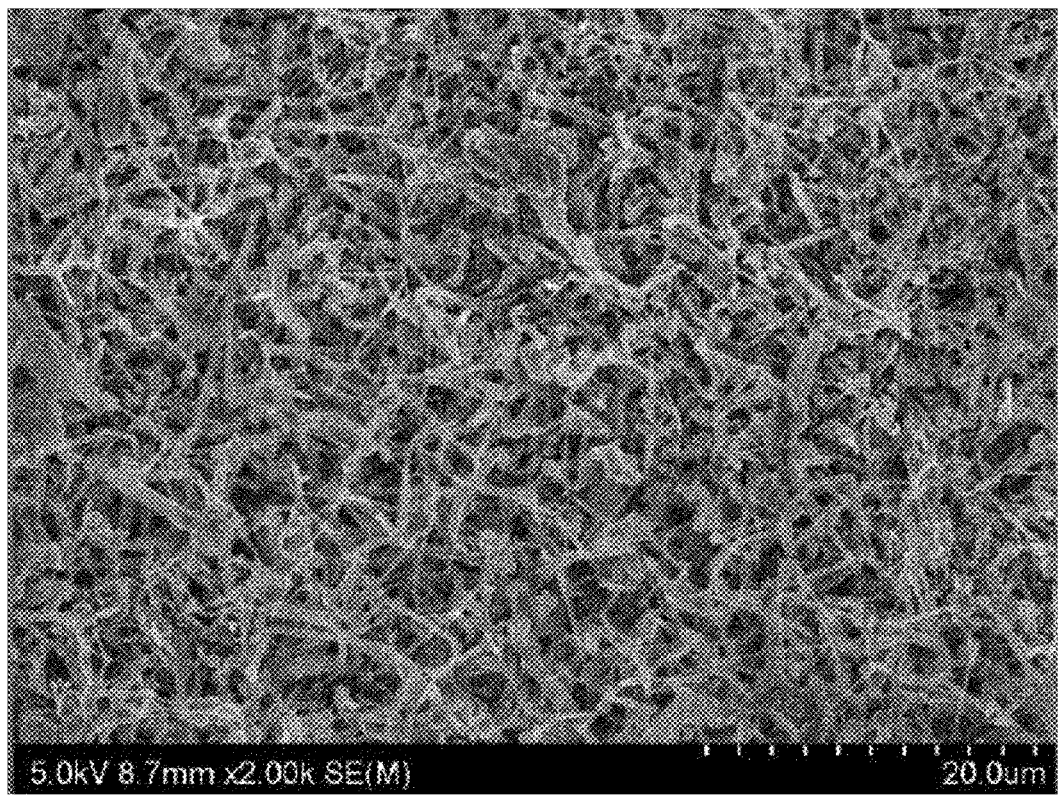

[Figure 10]
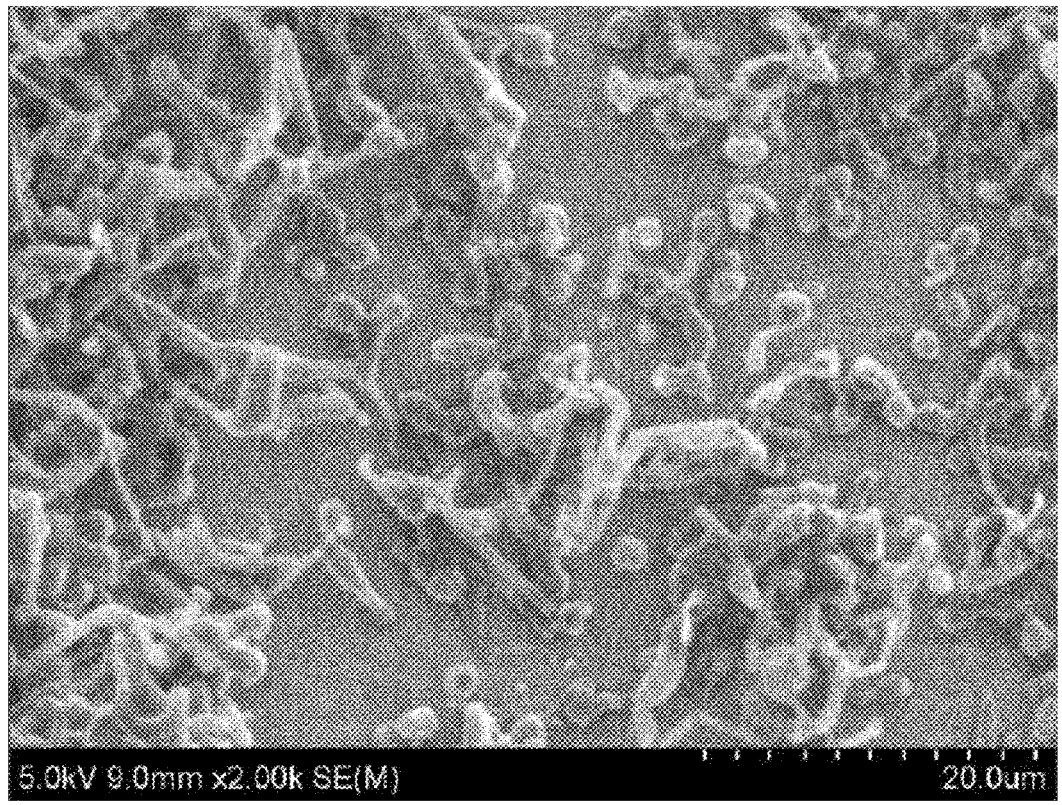

LITHIUM SECONDARY BATTERY

TECHNICAL FIELD

This application claims priority to and the benefits of Korean Patent Application No. 10-2017-0078615, filed with the Korean Intellectual Property Office on Jun. 21, 2017, and Korean Patent Application No. 10-2018-0070931, filed with the Korean Intellectual Property Office on Jun. 20, 2018, the entire contents of which are incorporated herein by reference.

The present invention relates to a lithium secondary battery having a negative electrode free (anode free) structure using metal particles.

BACKGROUND ART

Various battery-requiring devices from portable phones, wireless home appliances to electric vehicles have been recently developed, and with the development of such devices, demands for secondary batteries have also increased. Particularly, with the trend of smaller electronic goods, secondary batteries tend to be lighter and smaller as well.

Corresponding to such a trend, lithium secondary batteries using lithium metal as an active material have recently received attention. Lithium metal has a property of low oxidation-reduction potential (−3.045 V with respect to standard hydrogen electrode) and large weight energy density (3,860 $mAhg^{-1}$), and has been expected as a negative electrode material of high capacity secondary batteries.

However, when using lithium metal as a battery negative electrode, the battery is generally manufactured by attaching lithium foil on a flat current collector, and since lithium explosively reacts with water and also reacts with oxygen in the atmosphere with its high reactivity as an alkali metal, there is a disadvantage in that manufacture and use are difficult under general environments. Particularly, an oxide layer such as LiOH, $Li_2O$ and $Li_2CO_3$ is obtained as a result of oxidation when lithium metal is exposed to the atmosphere. When a surface oxide layer (native layer) is present on the surface, the oxide layer functions as an insulator film decreasing electrical conductivity, and causes a problem of increasing electric resistance by inhibiting smooth lithium ion migration.

For such a reason, the problem of forming a surface oxide layer caused by lithium metal reactivity has been partly improved by performing a vacuum deposition process in forming a lithium negative electrode, however, fundamental suppression of surface oxide layer formation is still impossible by the exposure to the atmosphere during a battery assembly process. In view of the above, development of a lithium metal electrode capable of resolving a lithium reactivity problem and more simplifying a process while increasing energy efficiency by using lithium metal has been required.

PATENT DOCUMENTS

Korean Patent Application Laid-Open Publication No. 10-2016-0052323 "Lithium electrode and lithium battery containing the same"

DISCLOSURE

Technical Problem

As a result of extensive studies in view of the above, the inventors of the present invention have designed a negative electrode free (anode free) battery structure capable of forming a lithium metal layer on a negative electrode current collector by lithium ions transferred from a positive electrode active material through charge after assembling the battery so as to fundamentally block a contact of the lithium metal with the atmosphere when assembling the battery, and have developed a composition of a positive electrode active material capable of stably forming the lithium metal layer.

Accordingly, an aspect of the present invention provides a lithium secondary battery having enhanced performance and lifetime by resolving a problem caused by lithium metal reactivity and a problem occurring during an assembly process.

Technical Solution

According to an aspect of the present invention, there is provided a lithium secondary battery including a positive electrode, a negative electrode, and a separator and an electrolyte interposed therebetween, wherein, in the negative electrode, metal particles are formed on a negative electrode current collector, and lithium metal moved from the positive electrode is formed on the negative electrode current collector in the negative electrode through charge.

Herein, the lithium metal formed on the negative electrode current collector is formed through one-time charge with a voltage of 4.5 V to 2.5 V.

In addition, the negative electrode current collector may be further provided with a protective layer formed on a surface in contact with the separator.

Advantageous Effects

A lithium secondary battery according to the present invention is coated while being blocked from the atmosphere through a process of forming a lithium metal layer on a negative electrode current collector, and therefore, may suppress formation of a surface oxide layer in the lithium metal caused by oxygen and moisture in the atmosphere, and as a result, an effect of enhancing cycle lifetime properties is obtained.

DESCRIPTION OF DRAWINGS

FIG. 1 is a mimetic diagram of a lithium secondary battery manufactured according to a first embodiment of the present invention.

FIG. 2 is a mimetic diagram showing lithium ion ($Li^+$) migration when initially charging a lithium secondary battery manufactured according to a first embodiment of the present invention.

FIG. 3 is a mimetic diagram after completing initial charge of a lithium secondary battery manufactured according to a first embodiment of the present invention.

FIG. 4 is a mimetic diagram of a lithium secondary battery manufactured according to a second embodiment of the present invention.

FIG. 5 is a mimetic diagram showing lithium ion ($Li^+$) migration when initially charging a lithium secondary battery manufactured according to a second embodiment of the present invention.

FIG. 6 is a mimetic diagram after completing initial charge of a lithium secondary battery manufactured according to a second embodiment of the present invention.

FIG. 7 to FIG. 10 are frontal scanning electron microscope images of lithium metal layers prepared in Example 1, Example 2, Example 3 and Comparative Example 1.

BEST MODE

Hereinafter, the present invention will be described in detail with reference to accompanying drawings so that those skilled in the art may readily implement the present invention. However, the present invention may be embodied into various different forms, and is not limited to the present specification.

In the drawings, parts not relevant to the descriptions are not included in order to clearly describe the present invention, and like reference numerals are used for like elements throughout the specification. In addition, sizes and relative sizes of constituents shown in the drawings are unrelated to actual scales, and may be reduced or exaggerated for clarity of the descriptions.

FIG. 1 is a sectional diagram of a lithium secondary battery manufactured according to a first embodiment of the present invention, which is provided with a positive electrode including a positive electrode current collector (11) and a positive electrode mixture (13); a negative electrode including a negative electrode current collector (21); and a separator (30) and an electrolyte (not shown) interposed therebetween.

As for a negative electrode of a lithium secondary battery, the negative electrode is normally formed on a negative electrode current collector (21), however, in the present invention, a negative electrode free battery structure is assembled using only with a negative electrode current collector (21) having metal particles (not shown) formed on the surface, and then, through charge, lithium ions released from a positive electrode mixture (13) form a lithium metal layer (not shown) on the negative electrode current collector (21) as a negative electrode mixture to form a negative electrode having a known constitution of negative electrode current collector/negative electrode mixture, and as a result, a constitution of a common lithium secondary battery is formed.

In other words, a negative electrode free battery in the present invention may be a battery that is negative electrode free in which a negative electrode is not formed on a negative electrode current collector in initial assembly, or may be a concept including all batteries that may have a negative electrode by forming a negative electrode on a negative electrode current collector according to use.

In addition, in the negative electrode of the present invention, the form of lithium metal formed on a negative electrode current collector as a negative electrode mixture includes both a form in which lithium metal is formed into a layer, and a structure in which lithium metal is not formed into a layer (for example, a structure in which lithium metal aggregates in a particle form).

Hereinafter, the present invention is described based on a form of a lithium metal layer (23) in which lithium metal is formed into a layer, however, it is obvious that such a description does not exclude a structure in which lithium metal is not formed into a layer.

FIG. 2 is a mimetic diagram showing lithium ion (Li$^+$) migration when initially charging a lithium secondary battery manufactured according to a first embodiment of the present invention, and FIG. 3 is a mimetic diagram after completing initial charge of a lithium secondary battery manufactured according to a first embodiment of the present invention.

When describing with reference to FIG. 2 and FIG. 3, lithium ions are released from a positive electrode mixture (13) in a positive electrode (10) when charging a lithium secondary battery having a negative electrode free battery structure by applying a voltage of certain level or higher, and these ions migrate toward a negative electrode current collector (21) side after passing through a separator (30), and a lithium metal layer (23) formed purely with lithium is formed on the negative electrode current collector (21) to form a negative electrode (20). Particularly, by using metal particles (not shown) formed with metals or metalloids capable of forming an alloy with lithium, the lithium metal layer (23) may be more readily formed, and a denser thin film structure may be formed.

Such lithium metal layer (23) formation through charge has advantages of forming a thin film layer and very readily controlling interface properties compared to an existing negative electrode sputtering a lithium metal layer (23) on a negative electrode current collector (21) or laminating lithium foil and a negative electrode current collector (21). In addition, since binding strength of the lithium metal layer (23) laminated on the negative electrode current collector (21) is high and stable, a problem of being removed from the negative electrode current collector (21) by going back to an ionization state through discharge does not occur.

Particularly, by being formed to have a negative electrode free battery structure, the lithium metal is not exposed to the atmosphere at all during a battery assembly process, and therefore, existing problems such as forming a surface oxide layer due to high reactivity of lithium itself, and a decrease in the lifetime of a lithium secondary battery caused therefrom may be fundamentally blocked.

Particularly, in the negative electrode free battery structure of the present invention, the negative electrode current collector (21) forming the negative electrode has a thickness of 3 μm to 500 μm, and having metal particles (not shown) formed on the surface is used. When forming a lithium metal layer through charge as a negative electrode free electrode, Li nucleation over potential may occur depending on the material of the negative electrode current collector, and due to such resistance, a decrease in the initial Coulombic efficiency may occur. Therefore, when forming metal particles (not shown), Li nucleation over potential may hardly exist when Li ions are precipitated as Li by charge transfer depending on the material of the metal particles (not shown).

The metal particles may be metals or metalloids capable of forming an alloy with lithium, and may include at least one selected from the group consisting of aluminum, silver, gold, bismuth, germanium, magnesium, manganese, molybdenum, sodium, nickel, osmium, lead, palladium, platinum, plutonium, rubidium, rhodium, ruthenium, antimony, selenium, silicon, tin, strontium, tantalum, tellurium, titanium, uranium, vanadium, tungsten, zinc and zirconium. Silver or gold is preferably used. Sulfur or phosphorus may also be used as particles.

The metal particles may be included in a content of 0.1% by weight to 40% by weight and preferably in a content of 1% by weight to 20% by weight with respect to the current collector.

When the metal particle content is less than 0.1% by weight, the particles are not uniformly formed decreasing plating efficiency of the Li metal, and when the content is greater than 40% by weight, the current collector weight increases, and electric energy density may be lowered or the metal may be formed into a layer instead of particles.

The metal particle formation is not particularly limited in the present invention, and known methods may be used. As one example, a dry method such as a chemical vapor deposition (CVD) method, a sputtering method, an e-beam evaporation method, an atomic layer deposition (ALD) method or a vacuum deposition method may be used. In addition, a precursor including a metal of the metal particles may be coated and then heat treated to form the metal particles. Herein, as the precursor, known precursors such as chlorides or nitrides may be used. Through the heat treatment, dewetting occurs due to changes in the material surface energy and an aggregation phenomenon, a unique property of the material, and the coating layer is changed into a nano dot form as a result. A catalyst material coating layer generally changes to a metal particle form when heat treated for 10 minutes at a temperature of approximately 250° C.

Such metal particles perform a role of a seed for growing lithium ions transferred from a positive electrode to a lithium metal layer (23). As a result, the formed lithium metal layer (23) has a dense while uniform microstructure on the negative electrode current collector (21).

In addition, the metal particles are present in an island form rather than a continuous layer of the coating layer on the negative electrode current collector (21) in order to perform a role as a seed. Herein, the metal particles are formed on the negative electrode current collector (21) while being separated with a gap of greater than or equal to 1 nm and less than 10 μm and preferably with a gap of greater than or equal to 1 nm and less than 2 μm.

The negative electrode current collector (21) capable of forming a lithium metal layer (23) through charge is not particularly limited as long as it has conductivity without inducing chemical changes to a lithium secondary battery. As an example, copper, stainless steel, aluminum, nickel, titanium, baked carbon, copper or stainless steel of which surface is treated with carbon, nickel, titanium, silver and the like, aluminum-cadmium alloys and the like may be used.

In addition, like the positive electrode current collector (11), various forms such as films, sheets, foil, nets, porous bodies, foams and non-woven fabrics having micro-unevenness formed on the surface may be used as the negative electrode current collector (21).

The lithium secondary battery having a negative electrode free structure provided with such a metal particle formed negative electrode current collector (21) may be obtained using various methods, however, a method of controlling a composition used in a positive electrode mixture (13) is used in the present invention.

As the positive electrode mixture (13), various positive electrode active materials may be used depending on the battery type, and although the positive electrode active material used in the present invention is not particularly limited as long as it is capable of intercalating or deintercalating lithium ions, a lithium transition metal oxide is typically used currently as a lithium transition metal compound included in a positive electrode active material capable of obtaining a battery with excellent lifetime properties and charge and discharge efficiency.

The lithium transition metal oxide includes 2 or more transition metals, and examples thereof may include layer compounds such as lithium cobalt oxide ($LiCoO_2$) or lithium nickel oxide ($LiNiO_2$) substituted with one or more transition metals; lithium manganese oxides substituted with one or more transition metals, lithium nickel-based oxides, spinel-based lithium nickel manganese composite oxides, spinel-based lithium manganese oxides in which some of Li in the chemical formula are substituted with alkaline-earth metal ions, olivine-based lithium metal phosphates and the like, but are not limited thereto.

Lithium-containing transition metal oxides are preferably used, and for example, at least one selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-Y}Co_YO_2$, $LiCo_{1-Y}Mn_YO_2$, $LiNi_{1-Y}Mn_YO_2$ (herein, $0 \leq Y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ (herein, $0<Z<2$), $Li_xM_yMn_{2-y}O_{4-z}A_z$ (herein, $0.9 \leq x \leq 1.2$, $0<y<2$, $0 \leq z<0.2$, M is one or more of Al, Mg, Ni, Co, Fe, Cr, V, Ti, Cu, B, Ca, Zn, Zr, Nb, Mo, Sr, Sb, W, Ti and Bi, A is one or more anions with valency of −1 or −2), $Li_{1+a}Ni_bM'_{1-b}O_{2-c}A'_c$ ($0 \leq a \leq 0.1$, $0 \leq b \leq 0.8$, $0 \leq c<0.2$, M' is at least one selected from the group consisting of 6-coordinated stable elements such as Mn, Co, Mg and Al, and A' is one or more anions having valency of −1 or −2.), $LiCoPO_4$ and $LiFePO_4$, and preferably, $LiCoO_2$ is used. In addition, sulfides, selenides, halides and the like may also be used in addition to such oxides.

The lithium transition metal oxide is used in the positive electrode mixture (13) as a positive electrode active material together with a binder, a conductor and the like. In the negative electrode free battery structure of the present invention, a lithium source for forming the lithium metal layer (23) becomes the lithium transition metal oxide. In other words, lithium ions in the lithium transition metal oxide is released when charging in a specific voltage range, and form a lithium metal layer (23) on the negative electrode current collector (21).

However, actual lithium ions in the lithium transition metal oxide are not readily released by itself, or there is no lithium capable of being involved other than charge and discharge at the above-mentioned operating voltage level, and therefore, it is very difficult to form the lithium metal layer (23), and when using only the lithium transition metal oxide, irreversible capacity greatly decreases causing a problem of declining capacity and lifetime properties of a lithium secondary battery.

Accordingly, in the present invention, a lithium metal compound, a highly irreversible material, having initial charge capacity of 200 mAh/g or greater when one-time charging with 0.01 C to 0.2 C in a voltage range of 4.5 V to 2.5 V, or having initial irreversibility of 30% or greater as an additive capable of providing a lithium source to the lithium transition metal oxide.

The 'highly irreversible material' mentioned in the present invention may be used to have the same meaning as a 'large capacity irreversible material' in another term, and this means a material having large irreversible capacity of a first cycle of charge and discharge, that is, "(first cycle charge capacity-first cycle discharge capacity)/first cycle charge capacity". In other words, a highly irreversible material may irreversibly provide lithium ions in excess during a first cycle of charge and discharge. For example, it may be, among lithium transition metal compounds capable of intercalating or deintercalating lithium ions, a positive electrode material having high irreversible capacity (first cycle charge capacity-first cycle discharge capacity) of a first cycle of charge and discharge.

Irreversible capacity of a generally used positive electrode active material is approximately from 2% to 10% with respect to initial capacity, however, in the present invention, a lithium metal compound that is a highly irreversible material, that is, a lithium metal compound having initial irreversibility of 30% or greater and preferably 50% or greater with respect to initial charge capacity may be used together. In addition, as the lithium metal compound, those having initial charge capacity of 200 mAh/g or greater and preferably 230 mAh/g or greater may be used. With such lithium metal compound use, a role of a lithium source capable of forming a lithium metal layer (23) may be performed while increasing irreversible capacity of the lithium transition metal oxide that is a positive electrode active material.

As the lithium metal compound provided in the present invention, compounds represented by the following Chemical Formula 1 to Chemical Formula 8 may be used.

$$Li_2Ni_{1-a}M^1{}_aO_2 \quad \text{[Chemical Formula 1]}$$

(In the formula, a is 0≤a<1, and $M^1$ is one or more types of elements selected from the group consisting of Mn, Fe, Co, Cu, Zn, Mg and Cd.)

$$Li_{2+b}Ni_{1-c}M^2{}_cO_{2+d} \quad \text{[Chemical Formula 2]}$$

(In the formula, −0.5≤b<0.5, 0≤c≤1, 0≤d<0.3, and $M^2$ is one or more types of elements selected from the group consisting of P, B, C, Al, Sc, Sr, Ti, V, Zr, Mn, Fe, Co, Cu, Zn, Cr, Mg, Nb, Mo and Cd.)

$$LiM^3{}_eMn_{1-e}O_2 \quad \text{[Chemical Formula 3]}$$

In the formula, e is 0≤e<0.5, and $M^3$ is one or more types of elements selected from the group consisting of Cr, Al, Ni, Mn and Co.)

$$Li_2M^4O_2 \quad \text{[Chemical Formula 4]}$$

(In the formula, $M^4$ is one or more types of elements selected from the group consisting of Cu and Ni.)

$$Li_{3+f}Nb_{1-g}M^5{}_gS_{4-h} \quad \text{[Chemical Formula 5]}$$

(In the formula, −0.1≤f≤1, 0≤g≤0.5, −0.1≤h≤0.5, and $M^5$ is one or more types of elements selected from the group consisting of Mn, Fe, Co, Cu, Zn, Mg and Cd.)

$$LiM^6{}_iMn_{1-i}O_2 \quad \text{[Chemical Formula 6]}$$

(In the formula, i is 0.05≤i<0.5, and $M^6$ is one or more types of elements selected from the group consisting of Cr, Al, Ni, Mn and Co.)

$$LiM^7{}_{2j}Mn_{2-2j}O_4 \quad \text{[Chemical Formula 7]}$$

(In the formula, j is 0.05≤j<0.5, and $M^7$ is one or more types of elements selected from the group consisting of Cr, Al, Ni, Mn and Co.)

$$Li_k\text{-}M^8{}_m\text{-}N_n \quad \text{[Chemical Formula 8]}$$

(In the formula, $M^8$ represents an alkaline-earth metal, k/(k+m+n) is from 0.10 to 0.40, m/(k+m+n) is from 0.20 to 0.50, and n/(k+m+n) is from 0.20 to 0.50.)

The lithium metal compounds of Chemical Formula 1 to Chemical Formula 8 have different irreversible capacity depending on the structure. These may be used either alone or as a mixture thereof, and perform a role of increasing irreversible capacity of a positive electrode active material.

As one example, the highly irreversible materials represented by Chemical Formulae 1 and 3 have different irreversible capacity depending on the type, and as one example, have numerical values as shown in the following Table 1.

TABLE 1

| | Initial Charge Capacity (mAh/g) | Initial Discharge Capacity (mAh/g) | Initial Coulombic Efficiency | Initial Irreversible Capacity Ratio |
|---|---|---|---|---|
| [Chemical Formula 1] Li$_2$NiO$_2$ | 370 | 110 | 29.7% | 70.3% |
| [Chemical Formula 3] LiMnO$_2$ | 230 | 100 | 43.5% | 56.5% |

TABLE 1-continued

| | Initial Charge Capacity (mAh/g) | Initial Discharge Capacity (mAh/g) | Initial Coulombic Efficiency | Initial Irreversible Capacity Ratio |
|---|---|---|---|---|
| [Chemical Formula 3] LiCr$_x$Mn$_{1-x}$O$_2$ | 230 | 80 | 34.8% | 65.2% |

In addition, the lithium metal compound of Chemical Formula 2 preferably belongs to space group Immm, and among these, Ni and M composite oxide forming a plane quadrature (Ni, M)O4 and the plane quadrature forming a primary chain while sharing an opposite side (side formed by O—O) is more preferred. The compound of Chemical Formula 2 preferably has a crystal lattice constant of a=3.7±0.5 Å, b=2.8±0.5 Å, c=9.2±0.5 Å, α=90°, β=90° and γ=90°.

In addition, the lithium metal compound of Chemical Formula 8 has an alkaline-earth metal content of 30 atom % to 45 atom %, and a nitrogen content of 30 atom % to 45 atom %. Herein, when the alkaline-earth metal content and the nitrogen content are in the above-mentioned range, thermal properties and lithium ion conducting properties of the compound of Chemical Formula 1 are excellent. In Chemical Formula 8, k/(k+m+n) is from 0.15 to 0.35 and for example, is from 0.2 to 0.33, m/(k+m+n) is from 0.30 to 0.45, and for example, is from 0.31 to 0.33, and n/(k+m+n) is from 0.30 to 0.45, and for example, is from 0.31 to 0.33.

According to one embodiment, a is from 0.5 to 1, b is 1 and c is 1 in the electrode active material of Chemical Formula 1.

When forming a coating layer with the compound of any one of Chemical Formulae 1 to 8, the active material exhibits stable properties while retaining low resistance properties even under an environment of lithium ions being consistently intercalated and deintercalated. In the electrode active material according to one embodiment of the present invention, the coating layer has a thickness of 1 nm to 100 nm. When the coating layer thickness is in the above-mentioned range, the positive electrode active material has excellent ion conducting properties.

In addition, an average particle diameter of the positive electrode active material is from 1 μm to 30 μm, and according to one embodiment, is from 8 μm to 12 μm. When the positive electrode active material has an average particle diameter in the above-mentioned range, excellent battery capacity properties are obtained.

Examples of the alkaline-earth metal-doped core active material may include magnesium-doped LiCoO$_2$. The magnesium content is from 0.01 parts by weight to 3 parts by weight based on 100 parts by weight of the core active material.

The lithium transition metal oxide is used in the positive electrode mixture (13) as a positive electrode active material together with a binder, a conductor and the like. In the negative electrode free battery structure of the present invention, a lithium source for forming the lithium metal layer (23) becomes the lithium transition metal oxide. In other words, lithium ions in the lithium transition metal oxide is detached when charging in a specific voltage range, and form a lithium metal layer (23) on the negative electrode current collector (21).

As for the charging range for forming the lithium metal layer (23) in the present invention, one-time charge is performed with 0.01 to 0.2C in a voltage range of 4.5 V to 2.5 V. When the charge is performed below the above-mentioned range, the lithium metal layer (23) is difficult to form, and when the charge is performed above the above-mentioned range, cell damage is caused, and charge and discharge are not properly progressed after overdischarge occurs.

The formed lithium metal layer (23) forms a uniform continuous or discontinuous layer on the negative electrode current collector (21). As one example, when the negative electrode current collector (21) has a foil form, a continuous thin film form may be obtained, and when the negative electrode current collector (21) has a three-dimensional porous structure, the lithium metal layer (23) may be discontinuously formed. In other words, the discontinuous layer has a discontinuously distributed form, and, by a region in which the lithium metal layer (23) is present and a region in which the lithium metal layer (23) is not present being present in a specific region and the region in which the lithium metal layer (23) is not present being distributed so as to isolate, disconnect or separate the region in which the lithium compound is present like an island type, means the region in which the lithium metal layer (23) is present being distributed without continuity.

The lithium metal layer (23) formed through such charge and discharge has a thickness of a minimum of 50 nm or greater, 100 µm or less, and preferably 1 µm to 50 µm in order to function as a negative electrode. When the thickness is less than the above-mentioned range, battery charge and discharge efficiency rapidly decreases, and, on the contrary, the thickness being greater than the above-mentioned range has a problem of reducing energy density of a battery although lifetime properties and the like are stable.

Particularly, by the lithium metal layer (23) provided in the present invention being prepared into a negative electrode free battery without lithium metal when assembling a battery, no or almost no oxide layer is formed on the lithium metal layer (23) due to high reactivity of lithium produced during an assembly process compared to a lithium secondary battery assembled using existing lithium foil. As a result, degradation in the battery lifetime caused by the oxide layer may be prevented.

In addition, the lithium metal layer (23) moves by charge of a highly irreversible material, and compared to forming a lithium metal layer (23) on a positive electrode, a more stable lithium metal layer (23) may be formed. When attaching lithium metal on a positive electrode, a chemical reaction may occur between the positive electrode and the lithium metal.

A positive electrode mixture (13) is formed including the positive electrode active material and the lithium metal compound, and herein, the positive electrode mixture (13) may further include a conductor, a binder, and other additives commonly used in a lithium secondary battery.

The conductor is used for further enhancing conductivity of the electrode active material. Such a conductor is not particularly limited as long as it has conductivity without inducing chemical changes to the corresponding battery, and examples thereof may include graphite such as natural graphite or artificial graphite; carbon black such as carbon black, acetylene black, ketjen black, channel black, furnace black, lamp black or thermal black; conductive fibers such as carbon fiber or metal fiber; fluorocarbon, aluminum, metal powders such as nickel powder; conductive whiskers such as zinc oxide or potassium titania; conductive metal oxides such as titanium oxide; polyphenylene derivatives and the like.

A binder may be further included for binding the positive electrode active material, the lithium metal compound and the conductor, and for binding on the current collector. The binder may include a thermoplastic resin or a thermosetting resin. For example, polyethylene, polypropylene, polytetrafluoroethylene (PTFE), polyvinylidene fluoride (PVDF), styrene-butadiene rubber, a tetrafluoroethylene-perfluoro alkylvinyl ether copolymer, a vinylidene fluoride-hexafluoropropylene copolymer, a vinylidene fluoride-chlorotrifluoroethylene copolymer, an ethylene-tetrafluoroethylene copolymer, a polychlorotrifluoroethylene, vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinyl ether-tetrafluoroethylene copolymer, an ethylene-acrylic acid copolymer and the like may be used either alone or as a mixture, however, the binder is not limited thereto, and those capable of being used as a binder in the art may all be used.

Examples of other additives may include a filler. The filler is selectively used as a component suppressing electrode expansion, and is not particularly limited as long as it is a fibrous material without inducing chemical changes to the corresponding battery. For example, olefin-based polymers such as polyethylene or polypropylene, or fibrous materials such as glass fiber or carbon fiber may be used.

The positive electrode mixture (13) of the present invention is formed on a positive electrode current collector (11).

The positive electrode current collector is generally prepared to a thickness of 3 µm to 500 µm. Such a positive electrode current collector (11) is not particularly limited as long as it has high conductivity without inducing chemical changes to a lithium secondary battery, and for example, stainless steel, aluminum, nickel, titanium, baked carbon, or aluminum or stainless carbon of which surface is treated with carbon, nickel, titanium, silver and the like may be used. Herein, the positive electrode current collector (11) may be used in various forms such as films, sheets, foil, nets, porous bodies, foams and non-woven fabrics having micro-unevenness formed on the surface so as to increase adhesive strength with a positive electrode active material.

A method of coating the positive electrode mixture (13) on the current collector may include a method of distributing the electrode mixture slurry on the current collector and then uniformly dispersing the result using a doctor blade or the like, a method such as die casting, comma coating or screen printing, and the like. In addition, the electrode mixture slurry may be bonded with the current collector using a pressing or lamination method after molding on a separate substrate, however, the method is not limited thereto.

Meanwhile, the lithium secondary battery according to a second embodiment of the present invention may further form a protective film (55) on a surface in contact with the separator (60) in the negative electrode. Specifically, when forming the protective film (55), a lithium metal layer 53 is formed by, as shown in FIGS. 4-6, lithium ions transferred from a positive electrode mixture (43) passing through a protective film (55) and being formed on a negative electrode current collector (51), and grows from metal particles (not shown).

Accordingly, any material may be used as the protective film (55) as long as it is capable of smoothly transferring lithium ions, and materials used in lithium ion conducting polymers and/or inorganic solid electrolytes may be used, and as necessary, a lithium salt may be further included.

Examples of the lithium ion conducting polymer may include any one selected from the group consisting of polyethylene oxide (PEO), polyacrylonitrile (PAN), polymethyl methacrylate (PMMA), polyvinylidene fluoride (PVDF), polyvinylidene fluoride-hexafluoropropylene (PVDF-HFP), LiPON, $Li_3N$, $LixLa_{1-x}TiO_3$ (0<x<1) and $Li_2S$—$GeS$—$Ga_2S_3$, or a mixture of two or more types thereof, but are not limited thereto, and polymers having lithium ion conductivity may be used without limit.

As for the formation of the protective film (55) using the lithium ion conducting polymer, a coating solution dissolving or swelling the lithium ion conducting polymer in a solvent is prepared, and the solution is coated on the negative electrode current collector (51) so as to include metal particles.

As for the coating method, a method may be selected from among known methods or proper new methods may be used considering material properties and the like. For example, a method of distributing a composition for the polymer protective layer on the current collector, and then uniformly dispersing the result using a doctor blade or the like is preferred. In some cases, a method of performing distribution and dispersion in one process may also be used. In addition thereto, methods of dip coating, gravure coating, slit die coating, spin coating, comma coating, bar coating, reverse roll coating, screen coating, cap coating and the like may be used in the preparation. Herein, the negative electrode current collector (51) is the same as described above.

After that, a drying process may be carried out for the protective film (55) formed on the negative electrode current collector (51), and herein, the drying process may be carried out using a method of heating treatment or hot air drying at a temperature of 80° C. to 120° C. depending on the solvent type used in the lithium ion conducting polymer.

Herein, the used solvent preferably has a similar solubility index with the lithium ion conducting polymer, and has a low boiling point. This is due to the fact that the mixing may be uniform, and the solvent may be readily removed thereafter. Specifically, N,N-dimethylacetamide (DMAc), dimethyl sulfoxide (DMSO), N,N-dimethylformamide (DMF), acetone, tetrahydrofuran, methylene chloride, chloroform, dimethylformamide, N-methyl-2-pyrrolidone (NMP), cyclohexane, water or a mixture thereof may be used as the solvent.

When using the lithium ion conducting polymer, materials used for further increasing lithium ion conductivity may be further included.

As one example, a lithium salt such as LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, LiC $(CF_3SO_2)_3$, $(CF_3SO_2)_2NLi$, $(FSO_2)_2NLi$, chloroborane lithium, lower aliphatic carboxylic acid lithium, lithium tetraphenylborate or lithium imide may be further included.

The inorganic solid electrolyte is a ceramic-based material, and crystalline or non-crystalline materials may be used, and inorganic solid electrolytes such as thio-LISICON $(Li_{3.25}Ge_{0.25}P_{0.75}S_4)$, $Li_2S$—$SiS_2$, LiI—$Li_2S$—$SiS_2$, LiI—$Li_2S$—$P_2S_5$, LiI—$Li_2S$—$P_2O_5$, LiI—$Li_3PO_4$—$P_2S_5$, $Li_2S$—$P_2S_5$, $Li_3PS_4$, $Li_7P_3S_{11}$, $Li_2O$—$B_2O_3$, $Li_2O$—$B_2O_3$—$P_2O_5$, $Li_2O$—$V_2O_5$—$SiO_2$, $Li_2O$—$B_2O_3$, $Li_3PO_4$, $Li_2O$—$Li_2WO_4$—$B_2O_3$, LiPON, LiBON, $Li_2O$—$SiO_2$, LiI, $Li_3N$, $Li_5La_3Ta_2O_{12}$, $Li_7La_3Zr_2O_{12}$, $Li_6BaLa_2Ta_2O_{12}$, $Li_3PO_{(4-3/2w)}Nw$ is (w is w<1) or $Li_{3.6}Si_{0.6}P_{0.4}O_4$ may be used. Herein, when using the inorganic solid electrolyte, a lithium salt may be further included as necessary.

The inorganic solid electrolyte may be mixed with known materials such as a binder, and used in a thick film form through slurry coating. In addition, as necessary, the inorganic solid electrolyte may be used in a thin film form through a deposition process such as sputtering. The used slurry coating method may be properly selected depending on the descriptions on the coating method, the drying method and the solvent provided in the lithium ion conducting polymer.

The protective film (55) including the lithium ion conducting polymer and/or the inorganic solid electrolyte described above may also secure an effect of suppressing or preventing production of lithium dendrite generated when using lithium metal layer (53)/negative electrode current collector (51) as a negative electrode, while readily forming the lithium metal layer (53) by increasing a lithium ion transferring rate.

In order to secure the effect, the thickness of the protective film (55) needs to be limited.

The protective film (55) having a smaller thickness is advantageous for output properties of a battery, however, the protective film (55) needs to be formed to a certain thickness or higher in order to suppress side reactions between an electrolyte and lithium formed on the negative electrode current collector (51) thereafter, and furthermore, in order to effectively block dendrite growth. In the present invention, the protective film (55) preferably has a thickness of 10 nm to 50 μm. When the thickness of the protective film (55) is less than the above-mentioned range, safety may not be enhanced since exothermic reactions and side reactions occurring between lithium and an electrolyte increasing under a condition of overcharge, high temperature storage or the like are not effectively suppressed, and when the thickness is greater than the above-mentioned range in the lithium ion conducting polymer, it takes a long time for the protective film (55) composition to be impregnated or swollen by an electrolyte liquid, and lithium ion migration decreases, which may lead to overall battery performance decline.

In the lithium secondary battery of the second embodiment, constitutions other than the protective film (55) follow descriptions provided in the first embodiment.

Meanwhile, as illustrated in the structures of FIG. 3 and FIG. 6, the lithium secondary battery includes a positive electrode (10 and 40), a negative electrode (20 and 50) and a separator (30, 60) and an electrolyte (not shown) interposed therebetween, and the separator (30, 60) may not be included depending on the battery type.

The separator (30, 60) may be formed with a porous substrate, and as the porous substrate, porous substrates commonly used in an electrochemical device may all be used, and for example, polyolefin-based porous membranes or non-woven fabrics may be used. However, the separator is not particularly limited thereto.

The separator (30, 60) according to the present invention is not particularly limited in the material, and those commonly used as a separator (30, 60) in a lithium secondary battery as a material physically separating a positive electrode and a negative electrode and having electrolyte and ion permeability may be used without particular limit. However, as a porous, non-conducting or insulating material, those having an excellent electrolyte liquid moisture retention ability while having low resistance for ion migration of the electrolyte liquid are particularly preferred. For example, polyolefin-based porous membranes or non-woven fabrics may be used. However, the separator is not particularly limited thereto.

Examples of the polyolefin-based porous membrane may include membranes formed with a polyolefin-based polymer such as polyethylene such as high density polyethylene, linear low density polyethylene, low density polyethylene and ultra-high molecular weight polyethylene, polypropylene, polybutylene and polypentene alone, or formed with a polymer mixing these.

Examples of the non-woven fabric other than the polyolefin-based non-woven fabric may include non-woven fabrics formed with polyphenylene oxide, polyimide, polyamide, polycarbonate, polyethylene terephthalate, polyethylene naphtha late, polybutylene terephthalate, polyphenylene sulfide, polyacetal, polyethersulfone, polyetheretherketone, polyester and the like alone, or formed with a polymer mixing these, and such a non-woven fabric has a fiber form forming a porous web, and includes spunbond or meltblown form formed with long fibers.

The thickness of the separator (30, 60) is not particularly limited, but is preferably in a range of 1 μm to 100 μm, and more preferably in a range of 5 μm to 50 μm. When the separator (30, 60) has a thickness of less than 1 μm, mechanical properties may not be maintained, and when the thickness is greater than 100 μm, the separator (30, 60) functions as a resistive layer declining battery performance.

A pore size and porosity of the separator (30, 60) are not particularly limited, however, the pore size is preferably from 0.1 μm to 50 μm, and the porosity is preferably from 10% to 95%. When the separator (30, 60) has a pore size of less than 0.1 μm or porosity of less than 10%, the separator (30, 60) functions as a resistive layer, and when the pore size is greater than 50 μm or the porosity is greater than 95%, mechanical properties may not be maintained.

The electrolyte of the lithium secondary battery is a non-aqueous electrolyte formed with a non-aqueous electrolyte liquid as a lithium salt-containing electrolyte liquid, and a lithium salt. In addition thereto, an organic solid electrolyte, an inorganic solid electrolyte or the like may be included, however, the electrolyte is not limited thereto.

Examples of the non-aqueous organic solvent may include aprotic organic solvents such as N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, tetrahydroxy franc, 2-methyl tetrahydrofuran, dimethyl sulfoxide, 1,3-dioxolane, 4-methyl-1,3-dioxene, diethyl ether, formamide, dimethylformamide, dioxolane, acetonitrile, nitromethane, methyl formate, methyl acetate, phosphoric acid triester, trimethoxymethane, dioxolane derivatives, sulfolane, methylsulfolane, 1,3-dimethyl-2-imidazolidinone, propylene carbonate derivatives, tetrahydrofuran derivatives, ether, methyl propionate or ethyl propionate may be used.

The electrolyte salt included in the non-aqueous electrolyte liquid is a lithium salt. As the lithium salt, those commonly used in electrolyte liquids for a lithium secondary battery may be used without limit. For example, an anion of the lithium salt may include any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, or two or more types thereof.

As the organic solvent included in the non-aqueous electrolyte liquid, those commonly used in electrolytes for a lithium secondary battery may be used without limit, and for example, ether, ester, amide, linear carbonate, cyclic carbonate and the like may be used either alone, or as a mixture of two or more types thereof. Among these, a carbonate compound that is cyclic carbonate, linear carbonate or a mixture thereof may be typically included.

Specific examples of the cyclic carbonate compound may include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate and halides thereof, or a mixture of two or more types thereof. Examples of the halides thereof may include fluoroethylene carbonate (FEC) and the like, but are not limited thereto.

Specific examples of the linear carbonate compound may typically include any one selected from the group consisting of dimethyl carbonate (DMC), diethyl carbonate (DEC), dipropyl carbonate, ethylmethyl carbonate (EMC), methylpropyl carbonate and ethylpropyl carbonate, or a mixture of two or more types thereof, but are not limited thereto.

Particularly, among the carbonate-based organic solvents, ethylene carbonate and propylene carbonate that are cyclic carbonate are a highly viscous organic solvent and have a high dielectric constant, and therefore, may more favorably dissociate a lithium salt in an electrolyte, and when mixing and using linear carbonate having low viscosity and low dielectric constant such as dimethyl carbonate and diethyl carbonate in a proper ratio to such cyclic carbonate, an electrolyte liquid having higher electrical conductivity may be prepared.

In addition, as the ether among the organic solvents, any one selected from the group consisting of dimethyl ether, diethyl ether, dipropyl ether, methylethyl ether, methylpropyl ether and ethylpropyl ether, or a mixture of two or more types thereof may be used, however, the ether is not limited thereto.

As the ester among the organic solvents, any one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone and ε-caprolactone, or a mixture of two or more types thereof may be used, however, the ester is not limited thereto.

The non-aqueous electrolyte liquid may be injected at a proper stage in an electrochemical device manufacturing process depending on a manufacturing process and required properties of a final product. In other words, the non-aqueous electrolyte liquid may be used at a stage prior to assembling an electrochemical device or at a final stage of electrochemical device assembly.

As the organic solid electrolyte, for example, polyethylene derivatives, polyethylene oxide derivatives, polypropylene oxide derivatives, phosphoric acid ester polymers, polyagitation lysine, polyester sulfide, polyvinyl alcohol, polyvinylidene fluoride, polymers including an ionic dissociation group, and the like may be used.

As the inorganic solid electrolyte, for example, nitrides, halides, sulfates and the like of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ or $Li_3PO_4$—$Li_2S$—$SiS_2$ may be used.

With the purpose of improving charge and discharge properties and flame retardancy, for example, pyridine, triethylphosphite, triethanolamine, cyclic ether, ethylenediamine, n-glyme, hexaphosphoric acid triamide, nitrobenzene derivatives, sulfur, quinoneimine dyes, N-substituted oxazolidinone, N,N-substituted imidazolidine, ethylene glycol dialkyl ether, ammonium salts, pyrrole, 2-methoxyethanol, aluminum trichloride or the like may also be added to the non-aqueous electrolyte. In some cases, halogen-containing solvents such as carbon tetrachloride and trifluoroethylene may be further included in order to provide non-flammability, and carbon dioxide gas may be further included in order to enhance high temperature storage properties.

The shape of the lithium secondary battery described above is not particularly limited, and examples thereof may include a jelly-roll type, a stack type, a stack-folding type (including stack-Z-folding type) or a lamination-stack type, and may preferably be a stack-folding type.

After preparing an electrode assembly having the positive electrode, the separator and the negative electrode consecutively laminated, the electrode assembly is placed in a battery case, the electrolyte liquid is injected to the top of the case, and the result is sealed with a cap plate and a gasket and then assembled to manufacture a lithium secondary battery.

Herein, depending on the positive electrode material and the separator type, the lithium secondary battery may be divided into various batteries such as a lithium-sulfur battery, a lithium-air battery, a lithium-oxide battery or a lithium all-solid-state battery, and depending on the shape, may be divided into a cylinder-type, a square-type, a coin-type, a pouch-type and the like, and depending on the size, may be divided into a bulk type and a thin film type. Structures and manufacturing methods of these batteries are widely known in the art, and therefore, detailed descriptions thereon are not included.

The lithium secondary battery according to the present invention may be used as a power supply of devices requiring high capacity and high rate properties. Specific examples of the device may include power tools operated through receiving electric power by a battery motor; electric vehicles including electric vehicles (EV), hybrid electric vehicles (HEV), plug-in hybrid electric vehicles (PHEV) and the like; electric two-wheeled vehicles including e-bikes, e-scooters and the like; electric golf carts; systems for power storage and the like, but are not limited thereto.

Hereinafter, preferred examples are provided in order to illuminate the present invention, however, the following examples are for illustrative purposes only, and it is obvious to those skilled in the art that various modifications and changes may be made within the scope of category and technological ideas of the present invention, and such modifications and changes also belong to the attached claims.

EXAMPLE

Example 1

Manufacture of Negative Electrode Free Battery (1) Preparation of Positive Electrode After mixing $LiCoO_2$ (LCO):Super-P:binder (PVdF) in a weight ratio of 95:2.5:2.5 in 30 ml of N-methyl-2-pyrrolidone, the result was mixed for 30 minutes using a paste face mixer to prepare a slurry composition. Herein, the weight of the added LCO was 15 g.

Subsequently, the prepared slurry composition was coated on a current collector (Al foil, thickness 20 μm), and the result was dried for 12 hours at 130° C. to prepare a positive electrode.

(2) Preparation of Au Metal Particle-Formed Negative Electrode Current Collector Au metal particles were formed on a copper current collector using an atomic layer deposition method. Herein, an average particle diameter of the Au metal particles was measured as 50 nm, and as a result of an element content analysis conducted using an electron scanning microscope (JSM-7610F, JEOL), 8% by weight was observed with respect to the Cu weight.

(3) Manufacture of Negative Electrode Free Battery

A porous polyethylene separator was provided between the positive electrode prepared in (1) and the negative electrode current collector of (2) to prepare an electrode assembly, and after placing the electrode assembly inside a case, an electrolyte was injected thereto to manufacture a lithium secondary battery. Herein, as the electrolyte, a compound prepared by dissolving 1 M $LiPF_6$ and 2% by weight of vinylene carbonate (VC) in an organic solvent formed with ethylene carbonate (EC):diethyl carbonate (DEC):dimethyl carbonate in a volume ratio of 1:2:1 was used.

Example 2

Manufacture of Negative Electrode Free Battery (1) Preparation of Positive Electrode After mixing $LiCoO_2$ (LCO):Super-P:binder (PVdF) in a weight ratio of 95:2.5:2.5 in 30 ml of N-methyl-2-pyrrolidone, the result was mixed for 30 minutes using a paste face mixer to prepare a slurry composition. Herein, the weight of the added LCO was 15 g.

Subsequently, the prepared slurry composition was coated on a current collector (Al foil, thickness 20 μm), and the result was dried for 12 hours at 130° C. to prepare a positive electrode.

(2) Preparation of Ag Metal Particle-Formed Negative Electrode Current Collector Ag metal particles were formed on a copper current collector using an atomic layer deposition method. Herein, an average particle diameter of the Ag metal particles was measured as 50 nm, and as a result of an element content analysis conducted using an electron scanning microscope (JSM-7610F, JEOL), 15% by weight was observed with respect to the Cu weight.

(3) Manufacture of Negative Electrode Free Battery

A porous polyethylene separator was provided between the positive electrode prepared in (1) and the negative electrode current collector of (2) to prepare an electrode assembly, and after placing the electrode assembly inside a case, an electrolyte was injected thereto to manufacture a lithium secondary battery. Herein, as the electrolyte, a compound prepared by dissolving 1 M $LiPF_6$ and 2% by weight of vinylene carbonate (VC) in an organic solvent formed with ethylene carbonate (EC):diethyl carbonate (DEC):dimethyl carbonate in a volume ratio of 1:2:1 was used.

Example 3

Manufacture of Negative Electrode Free Battery (1) Preparation of Positive Electrode After mixing $LiCoO_2$ (LCO):Super-P:binder (PVdF) in a weight ratio of 95:2.5:2.5 in 30 ml of N-methyl-2-pyrrolidone, the result was mixed for 30 minutes using a paste face mixer to prepare a slurry composition. Herein, the weight of the added LCO was 15 g.

Subsequently, the prepared slurry composition was coated on a current collector (Al foil, thickness 20 μm), and the result was dried for 12 hours at 130° C. to prepare a positive electrode.

(2) Preparation of Zn Metal Particle-Formed Negative Electrode Current Collector Zn metal particles were formed on a copper current collector using an atomic layer deposition method. Herein, an average particle diameter of the Zn metal particles was measured as 50 nm, and as a result of an element content analysis conducted using an electron scanning microscope (JSM-7610F, JEOL), 15% by weight was observed with respect to the Cu weight.

(3) Manufacture of Negative Electrode Free Battery

A porous polyethylene separator was provided between the positive electrode prepared in (1) and the negative electrode current collector of (2) to prepare an electrode assembly, and after placing the electrode assembly inside a case, an electrolyte was injected thereto to manufacture a lithium secondary battery. Herein, as the electrolyte, a compound prepared by dissolving 1 M $LiPF_6$ and 2% by weight of vinylene carbonate (VC) in an organic solvent formed with ethylene carbonate (EC):diethyl carbonate (DEC):dimethyl carbonate in a volume ratio of 1:2:1 was used.

Example 4

Manufacture of PEO Protective Film-Provided Li Free Battery (1) Preparation of Positive Electrode After mixing $LiCoO_2$ (LCO):Super-P:binder (PVdF) in a weight ratio of 95:2.5:2.5 in 30 ml of N-methyl-2-pyrrolidone, the result was mixed for 30 minutes using a paste face mixer to prepare a slurry composition. Herein, the weight of the added LCO was 15 g.

Subsequently, the prepared slurry composition was coated on a current collector (Al foil, thickness 20 μm), and the result was dried for 12 hours at 130° C. to prepare a positive electrode.

(2) Preparation of Protective Film-Formed Negative Electrode Current Collector

Au metal particles were formed on a copper current collector using an atomic layer deposition method. Herein, an average particle diameter of the Au metal particles was measured as 50 nm, and as a result of an element content analysis conducted using an electron scanning microscope (JSM-7610F, JEOL), 8% by weight was observed with respect to the Cu weight.

Polyethylene oxide (MV: 4,000,000) and lithium bis(trifluoromethansulfonyl)imide (LiTFSI, $(CF_3SO_2)_2NLi$) were mixed in an acetonitrile solvent so that EO:Li=9:1 (EO: repeating unit of PEO) to prepare a solution for forming a protective film.

After coating the solution for forming a protective film on the prepared copper current collector, the result was dried for 6 hours at 80° C. to form a protective film (thickness: 10 μm) on the copper current collector.

(3) Manufacture of Negative Electrode Free Battery

A porous polyethylene separator was provided between the positive electrode prepared in (1) and the negative electrode current collector of (2) to prepare an electrode assembly, and after placing the electrode assembly inside a case, an electrolyte was injected thereto to manufacture a negative electrode free battery. Herein, as the electrolyte, a compound prepared by dissolving 1 M $LiPF_6$ and 2% by weight of vinylene carbonate (VC) in an organic solvent formed with ethylene carbonate (EC):diethyl carbonate (DEC):dimethyl carbonate in a volume ratio of 1:2:1 was used.

Example 5

Manufacture of LiPON Protective Film-Provided Li Free Battery (1) Preparation of Positive Electrode After mixing $LiCoO_2$ (LCO):Super-P:binder (PVdF) in a weight ratio of 95:2.5:2.5 in 30 ml of N-methyl-2-pyrrolidone, the result was mixed for 30 minutes using a paste face mixer to prepare a slurry composition. Herein, the weight of the added LCO was 15 g.

Subsequently, the prepared slurry composition was coated on a current collector (Al foil, thickness 20 μm), and the result was dried for 12 hours at 130° C. to prepare a positive electrode.

(2) Preparation of LiPON Protective Film-Formed Negative Electrode Current Collector (21)

Au metal particles were formed on a copper current collector using an atomic layer deposition method. Herein, an average particle diameter of the Au metal particles was measured as 50 nm, and as a result of an element content analysis conducted using an electron scanning microscope (JSM-7610F, JEOL), 8% by weight was observed with respect to the Cu weight.

After that, a LiPON coating layer was formed on the copper current collector by sputtering for 25 minutes using a $Li_3PO_4$ target in a vacuum chamber under $N_2$ atmosphere. It was identified that the surface coating layer thickness was controlled depending on the deposition time, and a protective film (thickness: 0.2 μm) was formed on the copper current collector.

(3) Manufacture of Lithium Secondary Battery

A porous polyethylene separator was provided between the positive electrode prepared in (1) and the negative electrode current collector of (2) to prepare an electrode assembly, and after placing the electrode assembly inside a case, an electrolyte was injected thereto to manufacture a lithium negative electrode free battery. Herein, as the electrolyte, a compound prepared by dissolving 1 M $LiPF_6$ and 2% by weight of vinylene carbonate (VC) in an organic solvent formed with ethylene carbonate (EC):diethyl carbonate (DEC):dimethyl carbonate in a volume ratio of 1:2:1 was used.

Comparative Example 1

Manufacture of Lithium Secondary Battery

A negative electrode free battery provided with a common positive electrode was manufactured without using L2N.

(1) Preparation of Positive Electrode

After mixing $LiCoO_2$ (LCO):Super-P:binder (PVdF) in a weight ratio of 95:2.5:2.5 in 30 ml of N-methyl-2-pyrrolidone, the result was mixed for 30 minutes using a paste face mixer to prepare a slurry composition. Herein, the weight of the added LCO was 15 g.

Subsequently, the prepared slurry composition was coated on a current collector (Al foil, thickness 20 μm), and the result was dried for 12 hours at 130° C. to prepare a positive electrode.

(2) Preparation of Negative Electrode

A copper current collector was used as a negative electrode current collector (21).

(3) Manufacture of Lithium Secondary Battery

A porous polyethylene separator was provided between the positive electrode prepared in (1) and the negative electrode to prepare an electrode assembly, and after placing the electrode assembly inside a case, an electrolyte was injected thereto to manufacture a lithium secondary battery. Herein, as the electrolyte, a compound prepared by dissolving 1 M $LiPF_6$ and 2% by weight of vinylene carbonate (VC) in an organic solvent formed with ethylene carbonate (EC):diethyl carbonate (DEC):dimethyl carbonate in a volume ratio of 1:2:1 was used.

Comparative Example 2

Manufacture of Negative Electrode Free Battery

Based on Examples 1 and 4 described in KR Patent Application Laid-Open Publication No. 2016-0138120, a lithium secondary battery using $LiFePO_4$ as a positive electrode, and including fluoroethylene carbonate, an organic compound including fluorine, and lithium tetrafluoroborate, an inorganic salt, in an electrolyte liquid was manufactured.

positive electrode: LiFePO4, acetylene black and PVDF were mixed in a ratio of 90:5:5, and NMP was used as a solvent to prepare slurry for a positive electrode.

negative electrode: a negative electrode current collector (rolled copper foil current collector) was used.

electrolyte liquid: an electrolyte liquid described in Example 4 of KR Patent Application Laid-Open Publication No. 2016-0138120 (PC, LiBF4 1 M, FEC 20%) was used.

Experimental Example 1

Lithium Metal Layer Property Analysis

Changes in the properties of the lithium metal layer depending on the metal particle types and the charging conditions when forming the lithium metal layer were identified.

The manufactured negative electrode free batteries were charged and discharged under a condition of charging with 0.2 C, 4.25 V of CC/CV (5% current cut at 1 C), and discharging with 0.5 C CC 3 V to manufacture a lithium metal layer-formed lithium secondary battery.

FIG. 7 to FIG. 10 are frontal scanning electron microscope images of the lithium metal layers prepared in Example 1, Example 2, Example 3 and Comparative Example 1.

When examining FIG. 7, it was seen that the lithium metal layer of Example 1 had a uniform particle shape and a uniform surface having dendritic lithium disappeared compared to the lithium of Comparative Example 1 (refer to FIG. 10). When examining FIG. 8 and FIG. 9 (Examples 2 and 3), it was seen that the lithium particle size increases under the same condition when using Ag. By comparison, it was seen that, in Comparative Example 1 (refer to FIG. 10), the lithium metal layer was not able to be uniformly formed when there were no metal particles.

Experimental Example 2

Lithium Secondary Battery Characteristic Analysis

The batteries of Examples 1 to 5 and Comparative Examples 1 and 2 were charged and discharged under a condition of charging with 0.2 C, 4.25 V of CC/CV (5% current cut at 1 C), and discharging with 0.5 C CC 3 V to manufacture a lithium metal layer-formed lithium secondary battery. Subsequently, initial charge and discharge and Coulombic efficiency of the lithium secondary batteries were measured, and the results are shown in the following Table 2.

TABLE 2

|  | Initial Discharge (mAh/g) | Initial Coulombic Efficiency (%) |
| --- | --- | --- |
| Example 1 | 145.1 | 94.31 |
| Example 2 | 148.2 | 96.31 |
| Example 3 | 142.7 | 92.69 |
| Example 4 | 146.7 | 95.33 |
| Example 5 | 144.6 | 93.92 |
| Comparative Example 1 | 137.8 | 89.53 |
| Comparative Example 2 | 121 | 87.22 |

Through the results of Experimental Example 2, it was seen that initial discharge capacity and initial Coulombic efficiency of Examples 1 to 5 were all enhanced compared to Comparative Examples 1 and 2 that did not form metal particles.

REFERENCE NUMERAL 10, 40: Positive Electrode
11, 41: Positive Electrode Current Collector
13, 43: Positive Electrode Mixture
20, 50: Negative Electrode
21, 51: Negative Electrode Current Collector
23, 53: Lithium metal layer
30, 60: Separator

The invention claimed is:

1. A lithium secondary battery, comprising
a positive electrode, a negative electrode, and a separator and an electrolyte interposed therebetween,
wherein, in the negative electrode, metal particles are formed on a negative electrode current collector, and lithium metal moved from the positive electrode is formed on the negative electrode current collector in the negative electrode through charge,
wherein the metal particles are at least one metal or metalloid selected from the group consisting of silver, gold, magnesium, molybdenum, sodium, osmium, lead, palladium, platinum, plutonium, rubidium, rhodium, ruthenium, selenium, strontium, tantalum, tellurium, uranium, tungsten, and zirconium,
wherein the metal particles are included in a content of 0.1% by weight to 40% by weight with respect to the negative electrode current collector.

2. The lithium secondary battery of claim 1, wherein the lithium metal which is formed on the negative electrode current collector is formed through one-time charge in a voltage range of 4.5 V to 2.5 V.

3. The lithium secondary battery of claim 1, wherein the negative electrode further comprises a protective layer formed on a surface in contact with the separator.

4. The lithium secondary battery of claim 3, wherein the protective layer comprises any one or more of a lithium ion conducting polymer and an inorganic solid electrolyte.

5. The lithium secondary battery of claim 4, wherein the lithium ion conducting polymer is at least one selected from the group consisting of polyethylene oxide (PEO), polyacrylonitrile (PAN), polymethyl methacrylate (PMMA), polyvinylidene fluoride (PVDF), polyvinylidene fluoride-hexafluoropropylene (PVDF-HFP).

6. The lithium secondary battery of claim 4, wherein the inorganic solid electrolyte is at least one selected from the group consisting of thio-LISICON ($Li_{3.25}Ge_{0.25}P_{0.75}S_4$), $Li_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, $Li_2S$—$P_2S_5$, $Li_3PS_4$, $Li_7P_3S_{11}$, $Li_2O$—$B_2O_3$, $Li_2O$—$B_2O_3$—$P_2O_5$, $Li_2O$—$V_2O_5$—$SiO_2$, $Li_2O$—$B_2O_3$, $Li_3PO_4$, $Li_2O$—$Li_2WO_4$—$B_2O_3$, LiPON, LiBON, $Li_2O$—$SiO_2$, LiI, $Li_3N$, $Li_5La_3Ta_2O_{12}$, $Li_7La_3Zr_2O_{12}$, $Li_6BaLa_2Ta_2O_{12}$, $Li_3PO_{(4-3/2w)}Nw$ (w is w<1) and $Li_{3.6}Si_{0.6}P_{0.4}O_4$.

7. The lithium secondary battery of claim 4, wherein the protective layer further comprises one or more types of lithium salts selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, $(CF_3SO_2)_2NLi$, $(FSO_2)_2NLi$, chloroborane lithium, lower aliphatic carboxylic acid lithium, lithium tetraphenylborate and lithium imide.

8. The lithium secondary battery of claim 4, wherein the protective layer has a thickness of 10 nm to 50 μm.

9. The lithium secondary battery of claim 1, wherein the metal particles are formed on the negative electrode current collector and the metal particles are separated from each other with a gap of greater than or equal to 1 nm and less than 10 μm.

10. The lithium secondary battery of claim 1, wherein the positive electrode includes one or more types of positive electrode active materials selected from the group consisting of $LiCoO_2$, $LiNiO_2$, $LiMnO_2$, $LiMn_2O_4$, $Li(Ni_aCo_bMn_c)O_2$ (0<a<1, 0<b<1, 0<c<1, a+b+c=1), $LiNi_{1-Y}Co_YO_2$, $LiCo_{1-Y}Mn_YO_2$, $LiNi_{1-Y}Mn_YO_2$ (herein, 0≤Y<1), $Li(Ni_aCo_bMn_c)O_4$ (0<a<2, 0<b<2, 0<c<2, a+b+c=2), $LiMn_{2-z}Ni_zO_4$, $LiMn_{2-z}Co_zO_4$ (herein, 0<Z<2), $Li_xM_yMn_{2-y}O_{4-z}A_z$ (herein, 0.9≤x≤1.2, 0<y<2, 0≤z<0.2, M is one or more of Al, Mg, Ni, Co, Fe, Cr, V, Ti, Cu, B, Ca, Zn, Zr, Nb, Mo, Sr, Sb, W, Ti and Bi, A is one or more anions with valency of −1 or −2), $Li_{1+a}Ni_bM'_{1-b}O_{2-c}A'_c$ (0≤a≤0.1, 0≤b≤0.8, 0≤c<0.2, M' is at least one 6-coordinated stable element, and A' is one or more anions having valency of −1 or −2.), $LiCoPO_4$ and $LiFePO_4$.

11. The lithium secondary battery of claim 1, wherein the positive electrode includes a lithium metal compound represented by any one of the following Chemical Formulae 1 to 8:

[Chemical Formula 1]

in the formula, a is 0≤a<1, and $M^1$ is one or more types of elements selected from the group consisting of Mn, Fe, Co, Cu, Zn, Mg and Cd;

[Chemical Formula 2]

in the formula, −0.5≤b<0.5, 0≤c≤1, 0≤d<0.3, and $M^2$ is one or more types of elements selected from the group consisting of P, B, C, Al, Sc, Sr, Ti, V, Zr, Mn, Fe, Co, Cu, Zn, Cr, Mg, Nb, Mo and Cd;

[Chemical Formula 3]

in the formula, e is 0≤e<0.5, and $M^3$ is one or more types of elements selected from the group consisting of Cr, Al, Ni, Mn and Co;

[Chemical 4]

in the formula, $M^4$ is one or more types of elements selected from the group consisting of Cu and Ni;

[Chemical Formula 5]

in the formula, −0.1≤f≤1, 0≤g≤0.5, −0.1≤h≤0.5, and $M^5$ is one or more types of elements selected from the group consisting of Mn, Fe, Co, Cu, Zn, Mg and Cd;

[Chemical Formula 6]

in the formula, i is 0.05≤i<0.5, and $M^6$ is one or more types of elements selected from the group consisting of Cr, Al, Ni, Mn and Co;

[Chemical Formula 7]

in the formula, j is 0.05≤j<0.5, and $M^7$ is one or more types of elements selected from the group consisting of Cr, Al, Ni, Mn and Co;

[Chemical Formula 8]

in the formula, $M^8$ represents an alkaline-earth metal, k/(k+m+n) is from 0.10 to 0.40, m/(k+m+n) is from 0.20 to 0.50, and n/(k+m+n) is from 0.20 to 0.50.

12. The lithium secondary battery of claim 1, wherein the lithium metal formed on the negative electrode current collector is a lithium metal layer having a thickness of 50 nm to 100 μm.

\* \* \* \* \*